(12) United States Patent
Shaheen

(10) Patent No.: US 8,189,628 B2
(45) Date of Patent: May 29, 2012

(54) MAPPING MULTIPLE SERVICES INTO A SINGLE RADIO BEARER IN LTE AND SINGLE TUNNEL GPRS

(75) Inventor: Kamel M. Shaheen, King of Prussia, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 974 days.

(21) Appl. No.: 11/838,619

(22) Filed: Aug. 14, 2007

(65) Prior Publication Data

US 2008/0037491 A1    Feb. 14, 2008

Related U.S. Application Data

(60) Provisional application No. 60/837,534, filed on Aug. 14, 2006.

(51) Int. Cl.
*H04J 3/04* (2006.01)

(52) U.S. Cl. .......................... 370/535; 370/349

(58) Field of Classification Search .............. 370/310.2, 370/328, 329, 338, 341, 389, 401, 349, 535
See application file for complete search history.

(56) References Cited

U.S. PATENT DOCUMENTS 7,558,240 B2 *  7/2009  Chen et al. .................. 370/338
2003/0169771 A1   9/2003  Ahn et al.

FOREIGN PATENT DOCUMENTS

EP    1 096 742    5/2001
WO    03/067832    8/2003

OTHER PUBLICATIONS

3GPP, *3rd Generation Partnership Project; Technical Specification Group Services And System Aspects; 3GPP System Architecture Evolution: Report On Technical Options And Conclusions* (Release 7), 3GPP TR 23.882 V1.3.0 (Jul. 2006).

3GPP, *3rd Generation Partnership Project; Technical Specification Group Services And System Aspects; 3GPP System Architecture Evolution: Report On Technical Options And Conclusions* (Release 7), 3GPP TR 23.882 V1.9.0 (Mar. 2007).

* cited by examiner

*Primary Examiner* — Brenda H Pham
(74) *Attorney, Agent, or Firm* — Eric Berkowitz

(57) ABSTRACT

In a wireless communication system, a wireless transmit receive unit (WTRU) adapted to bundle a plurality of services into radio access bearer (RAB) in an uplink signal and unbundle a plurality of services from a RAB in a downlink signal. The WTRU is adapted to communicate with a plurality of services through a communications tunnel.

12 Claims, 5 Drawing Sheets

1

MAPPING MULTIPLE SERVICES INTO A SINGLE RADIO BEARER IN LTE AND SINGLE TUNNEL GPRS

CROSS REFERENCE TO RELATED APPLICATION

This application claims the benefit of U.S. provisional application No. 60/837,534 filed Aug. 14, 2006, which is incorporated by reference as if fully set forth.

FIELD OF INVENTION

The present invention relates generally to wireless communication systems. In particular, the present invention relates to allocating services to a single radio access bearer and a single packet data protocol context.

BACKGROUND

Current Third Generation Partnership Project (3GPP) specifications require that a single Radio Access Bearer (RAB) be allocated per activated service. A packet data protocol (PDP) context activation performed in generalized packet radio service (GPRS) and 3GPP systems is also dedicated to a single bearer service. Primary PDP context activation performs Internet protocol (IP) configuration and the selection of an application point node (APN) associated with session initiation protocol (SIP) signaling. A secondary PDP context activation is needed for each additional bearer service. This means that the three-way handshake process will be repeated over and over for each additional service to be activated, such as e-mail, streaming, web browsing, and the like.

FIG. 1 is a block diagram of a radio access bearer and PDP context architecture in accordance with the prior art. Multiple RABs 114, 116, 118 are established between a wireless transmit receive unit (WTRU) 101 and an evolved Node-B (eNB) 108. Multiple services 102, 104, 106 are running in the WTRU 101. Multiple PDP contexts 120, 122, 124 are established between the eNB 108 and a gateway 110. Each PDP context 120, 122, 124 is used to communicate with a separate application service 102, 104, 106. The gateway 110 routes the individual services 102, 104, 106 to an appropriate application node. As shown in FIG. 1, service 1 102 is routed to APN1. Service 2 104 is routed to APN2 128 and service 3 106 is routed to APN5 130.

There is a need to simplify the procedure by mapping multiple services into a single RAB and a single generic PDP context.

SUMMARY

In a wireless communication system, a wireless transmit receive unit (WTRU) is disclosed that is adapted to bundle a plurality of services into a radio access bearer (RAB) in an uplink signal and unbundle a plurality of services from a RAB in a downlink signal. The WTRU is adapted to communicate with a plurality of services through a communication tunnel.

Furthermore, a method is disclosed for establishing the tunnel, and for the WTRU to communicate across the tunnel with a plurality of applications. The method includes bundling a plurality RABs operating between a WTRU and a base station, and bundling more than one service into a single PDP context between a base station and an AGW. The application gateway preferably unbundles the plurality of services and connects to a plurality of application nodes.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
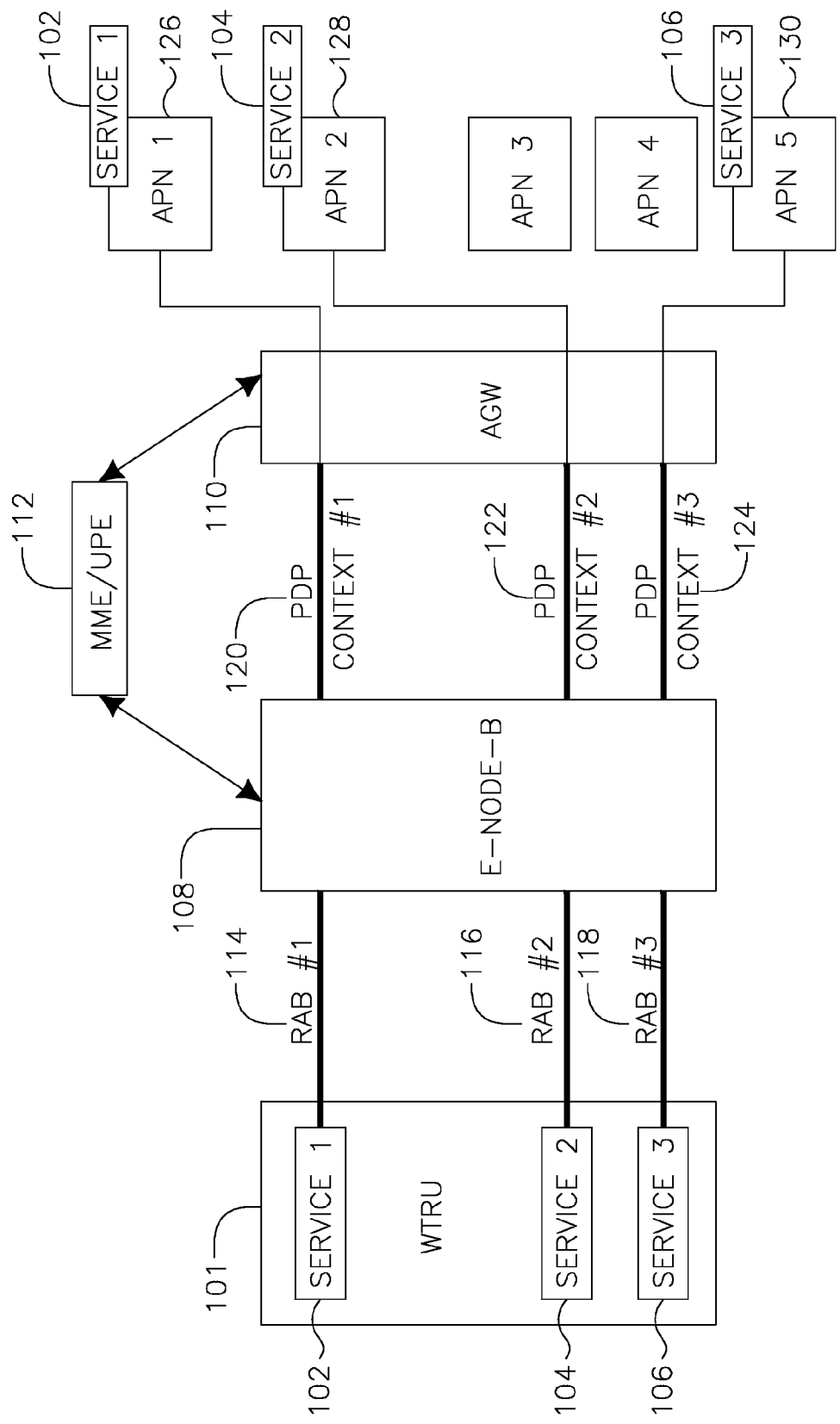
FIG. 1 is a block diagram of a RAB and PDP context architecture in accordance with the prior art.
Figure 2:
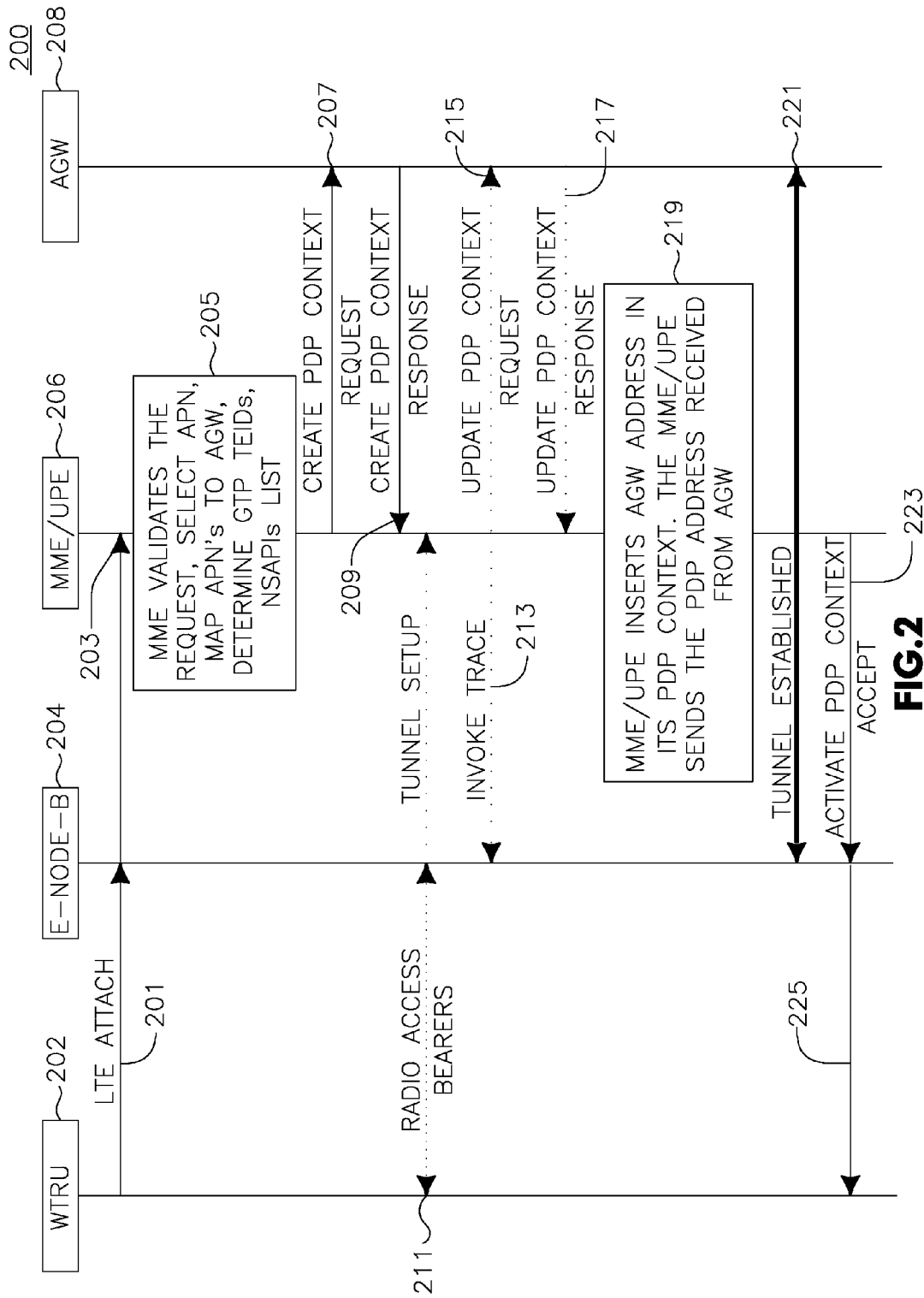
FIG. 2 is a signal flow diagram of generic RAB and PDP context activation in accordance with one embodiment of the present invention.

FIG. 2 is a signal flow diagram of generic RAB and PDP context activation procedure 200 in accordance with one embodiment of the present invention. The procedure 200 includes, at step 201, a WTRU 202 performs an Attach process to connect to an eNB 204. The Attach process may include, but is not limited to, generic PDP type, PDP address, a generic RAB service list, a list of application nodes (APNs), and a network layer service application identifier (NSAPI) list. At step 203, the eNB 204 communicates with a mobility management entity/user plane entity (MME/UPE) 206, and at step 205, the MME/UPE validates the Attach request, selects an application, and maps applications to the AGW. At step 207, the MME/UPE 206 creates a PDP context request which is forwarded to an application gateway (AGW) 208. The PDP context request may contain a generic PDP type, a PDP address, a service list, a NSAPI list, an APN list and eNB tunnel endpoint identifier (TEID). At step 209, the AGW 208 creates a PDP context response, in order to establish the tunnel. The PDP context response may contain a PDP type, a PDP address, an APN list, a GTP tunnel establish granted signal, and an AGW TEID. At step 211, a tunnel is setup between the MME/UPE 206 and the WTRU 202, including a PDP context and an RAB. The tunnel setup command may include a mobile station international ISDN number (MSIDN), PDP addresses and a generic RAB.

At step 213, a trace between the MME/UPE 206 and the eNB 204 is invoked, and, at step 215, the MME/UPE 206 updates the PDP context information with the AGW 208. At step 217 the AGW 208 responds to the MME/UPE 206 with a PDP context response. At step 219, the MME/UPE 206 inserts an AGW address in its PDP context. The MME/UPE 206 also sends the PDP address that it received from the AGW 208. At step 221 a tunnel is established between the AGW 208 and the eNB 204. The tunnel may be established by the eNB 204 and the AGW 208 signaling MSIDN, PDP address, eNB TEID and AGW TEID to each other. At steps 223 and step 225, a PDP context is activated between the MME/UPE 206 and the WTRU 202.

Figure 3:
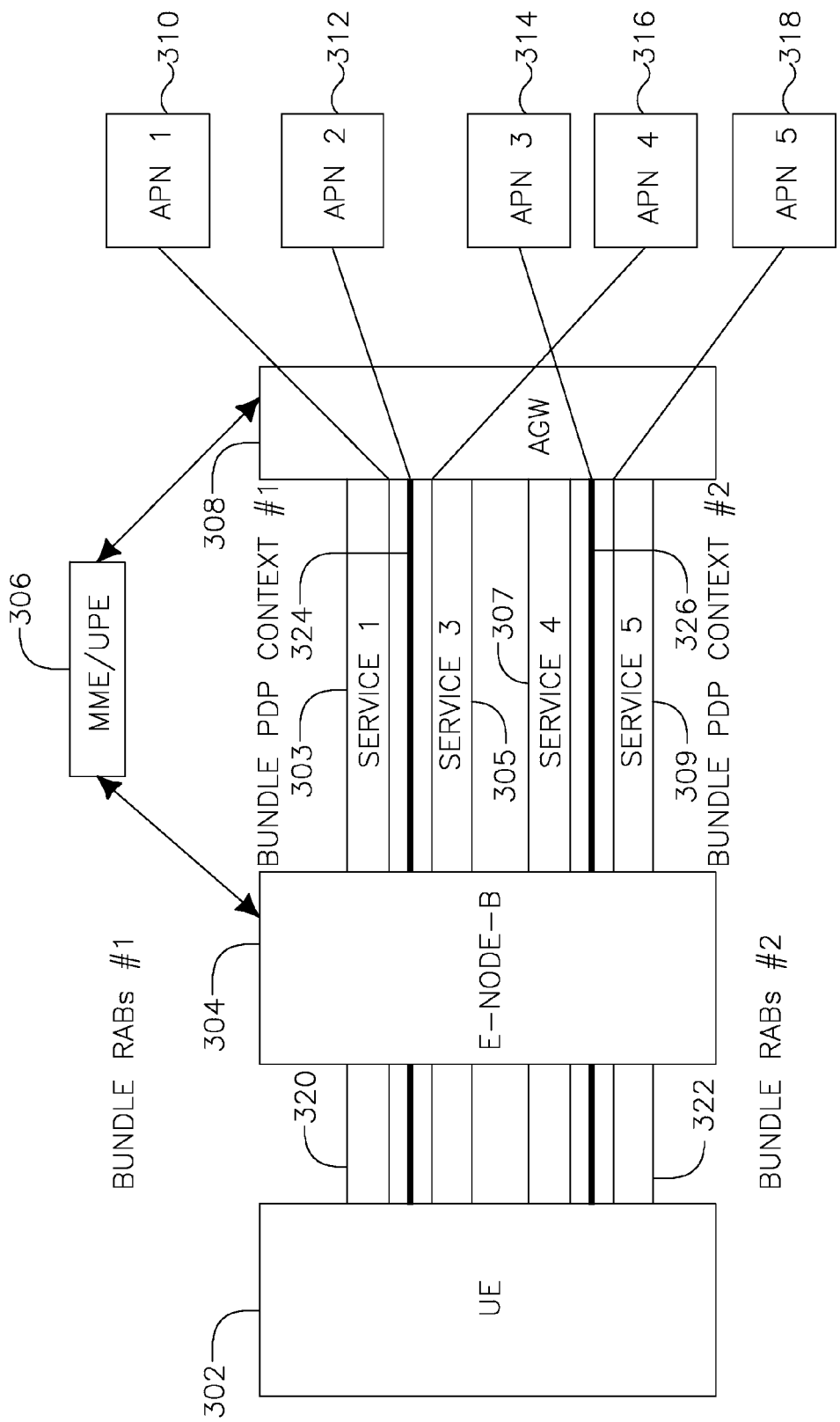
FIG. 3 is a block diagram of a bundled RAB and bundled PDP context architecture in accordance with an alternative embodiment of the present invention.

FIG. 3 is a block diagram of a bundled RAB and bundled PDP context architecture in accordance with one embodiment of the present invention. Two bundled RABs 320,322 exist between the WTRU 302 and the eNB 304. Multiple services 303, 305, 307, 309 are bundled into two PDP contexts 324, 326 between the eNB 304 and an AGW 308. An MME/UPE 306 is in control of both the eNB 304 and the AGW 308. The AGW 308 unbundles the services 303, 305, 307, 309 from the PDP contexts 324, 326 and routes them to an appropriate APN.

Figure 4:
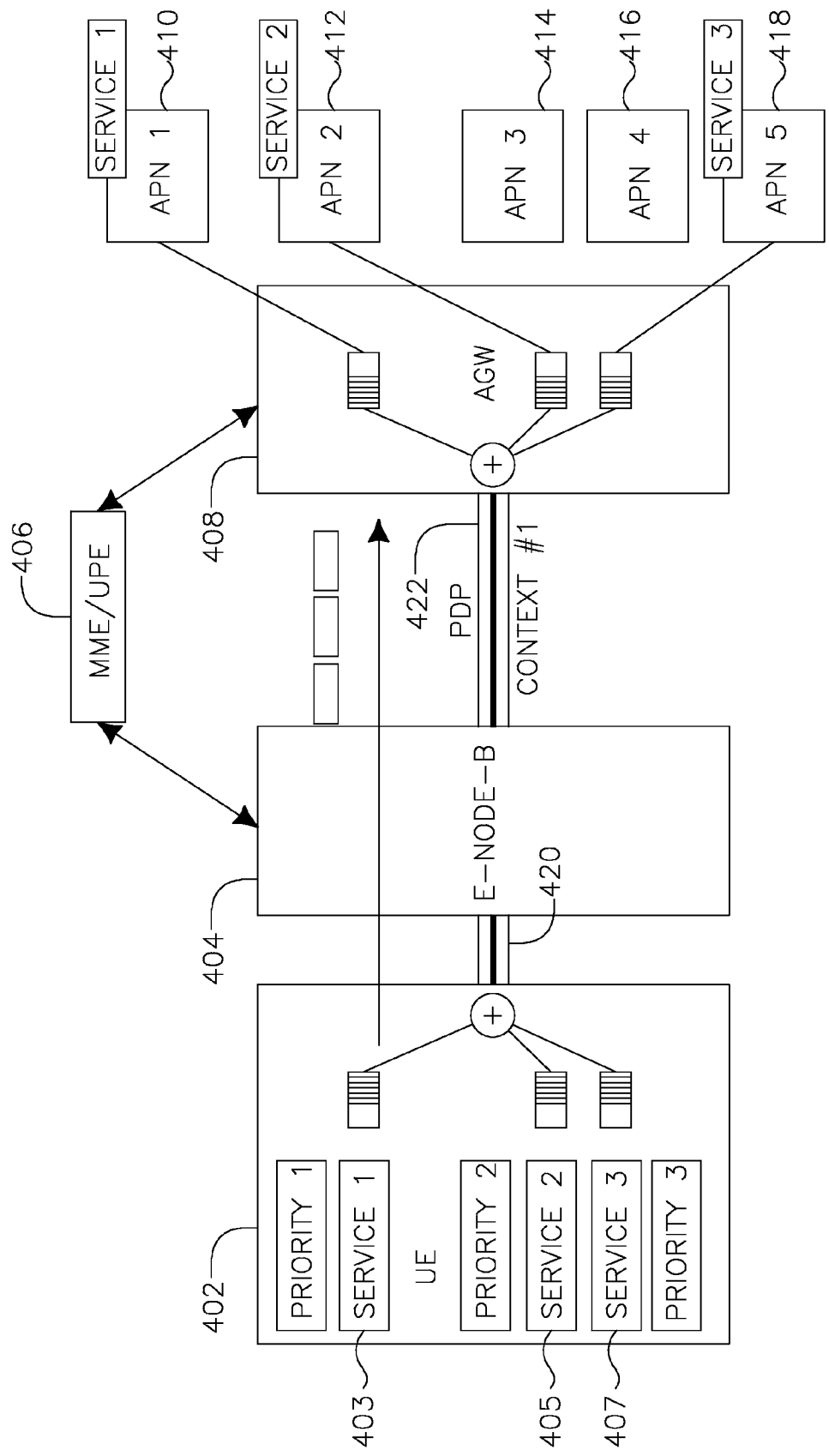
FIG. 4 is a block diagram of a single RAB and single PDP context upstream architecture in accordance with another embodiment of the present invention.

FIG. 4 is a block diagram of a single RAB and single PDP context upstream architecture in accordance with an alternative embodiment of the present invention. Service 1 403, service 2 405 and service 3 407 are prioritized at the WTRU 402 and communicate with the respective applications through a single RAB 420 to an eNB 404 and with a single PDP context 422 to an AGW 408. The AGW 408 unbundles the services 403, 405, 407 from the single PDP context 422 and forwards each service to its appropriate application. Service 1 403 is connected to APN 1 410, service 2 is connected to APN 2 412 and service 3 is connected to APN 5 418. In this embodiment, each PDU or SDU preferably contains an indication of priority.

Figure 5:
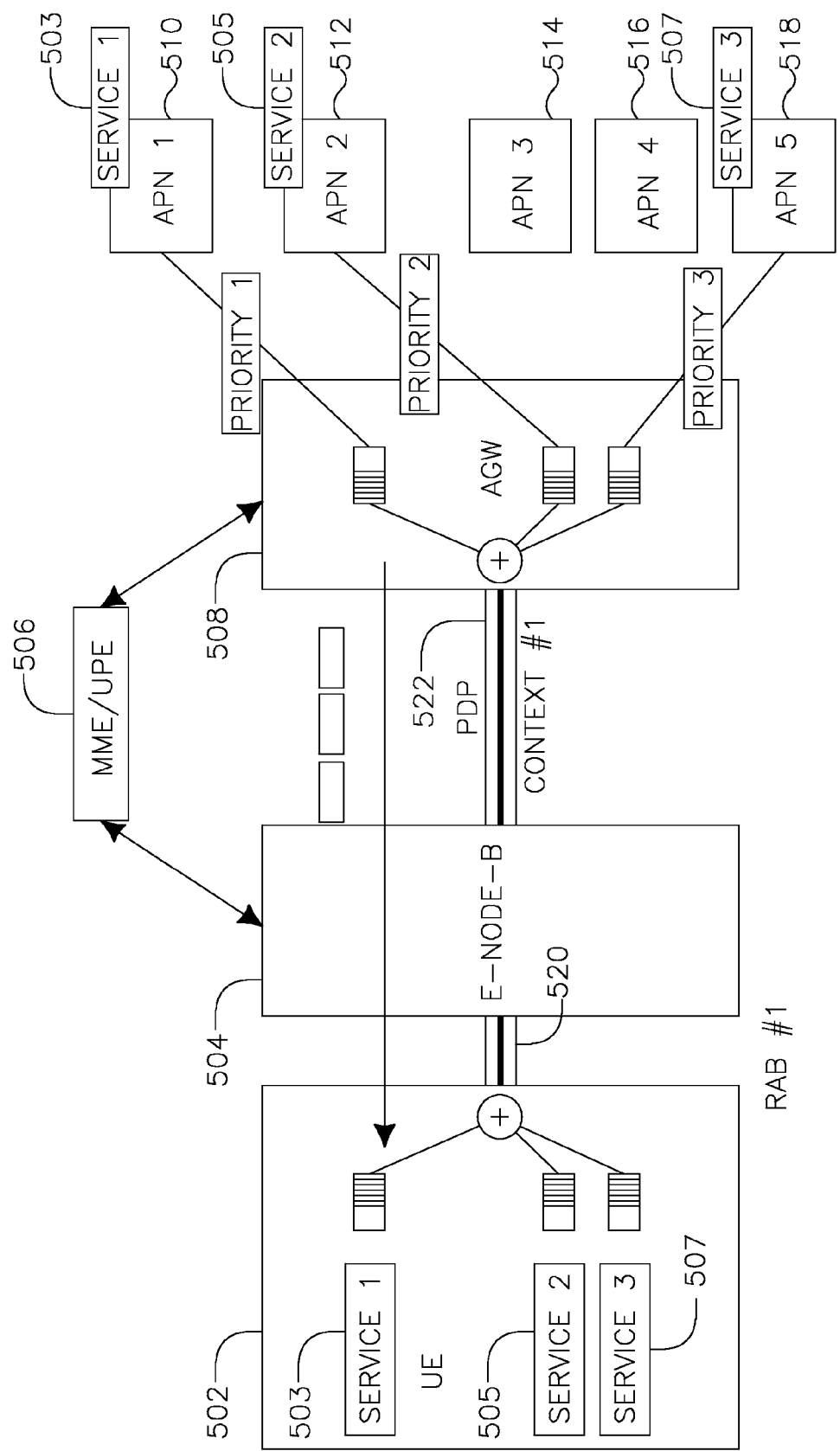
FIG. 5 is a block diagram of a single RAB and single PDP context downstream architecture in accordance with another embodiment of the present invention.

FIG. 5 is a block diagram of a single RAB and single PDP context downstream architecture in accordance with another embodiment of the present invention. Service 1 503 is communicating with APN 1 510. Service 2 505 is communicating with APN 2 512 and service 3 507 is communicating with APN 5 518. In the downlink, the services are prioritized and bundled at an AGW 508 into a single PDP context 522. An E-node B 504 transmits the PDP context 522 as a single radio bearer 520 to a WTRU 502. The WTRU 502 then unbundles the radio bearer signal and processes the multiple services.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for use in a network node, the method comprising:
    receiving a plurality of services via one or more radio access bearers (RABs);
    activating a single packet data protocol (PDP) context between the network node and a gateway, wherein the activating includes sending a PDP context request to the gateway and the PDP context request includes a list of services, the list of services representing each of the plurality of services; and
    bundling the plurality of services into the single PDP context.

2. The method of claim 1, wherein the PDP context request includes a tunnel endpoint identifier (TEID).

3. The method of claim 1, wherein each of the plurality of services corresponds to an application point node (APN).

4. The method of claim 1, further comprising:
    establishing a tunnel between the network node and the gateway for communication of the plurality of services.

5. The method of claim 4, wherein the tunnel is a General Packet Radio Service (GPRS) Tunneling Protocol (GTP) tunnel.

6. The method of claim 1, further comprising:
    assigning an indication of priority to each of the plurality of services.

7. A network node configured to bundle a plurality of services, the network node comprising:
    a receiver configured to receive a plurality of services via one or more radio access bearers (RABs); and
    a processor configured to:
        activate a single packet data protocol (PDP) context between the network node and a gateway, wherein the activating includes sending a PDP context request to the gateway and the PDP context request includes a list of services, the list of services representing each of the plurality of services; and
        bundle the plurality of services into the single PDP context.

8. The network node of claim 7, wherein the PDP context request includes a tunnel endpoint identifier (TEID).

9. The network node of claim 7, wherein each of the plurality of services corresponds to an application point node (APN).

10. The network node of claim 7, wherein the processor is further configured to establish a tunnel between the network node and the gateway for communication of the plurality of services.

11. The network node of claim 10, wherein the tunnel is a General Packet Radio Service (GPRS) Tunneling Protocol (GTP) tunnel.

12. The network node of claim 7, wherein the processor is further configured to assign an indication of priority to each of the plurality of services.

* * * * *